Jan. 16, 1923.

T. KELLY.
REVERSIBLE COVER FOR COOKERS.
FILED FEB. 13, 1922.

1,442,683.

Inventor
THOMAS KELLY

By
Attorneys.

Patented Jan. 16, 1923.

1,442,683

UNITED STATES PATENT OFFICE.

THOMAS KELLY, OF SAN FRANCISCO, CALIFORNIA.

REVERSIBLE COVER FOR COOKERS.

Application filed February 13, 1922. Serial No. 536,156.

*To all whom it may concern:*

Be it known that I, THOMAS KELLY, a citizen of the United States, and a resident of San Francisco, county of San Francisco, and State of California, have invented a new and useful Reversible Cover for Cookers, of which the following is a specification.

The present invention relates to cooking vessels generally and its particular object is to provide a cover or lid for a cooking vessel formed in such a manner that it can serve several functions. If secured on the vessel in the ordinary way it serves as a lid while when it is reversed it constitutes a second cooking vessel which may be used for such foods as marmalade and jams which do not require excessive heat, while the main vessel may be simultaneously used for cooking those foods which require more heat.

Figure 1:
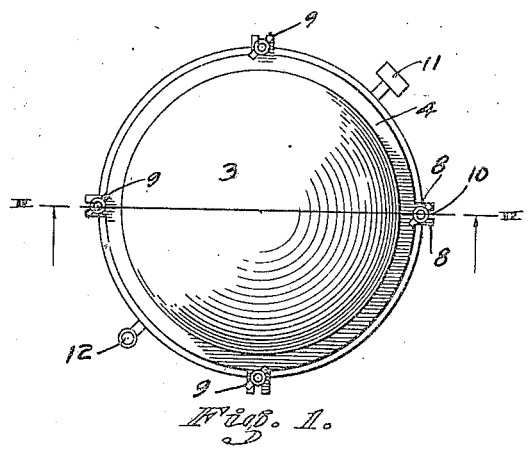
Figure 2:
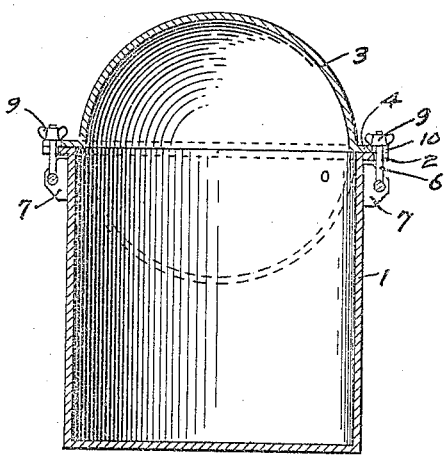

With this object in view I have illustrated the preferred form of my invention in the accompanying drawing, in which Figure 1 illustrates a top plan view of a cooking vessel having my lid secured thereon, and Figure 2 shows a vertical cross section through the device illustrated in Figure 1. While I have shown my lid in combination with one form of a cooking vessel only, it should be understood that the same may be used with equal facility for any vessel serving similar purposes.

Referring to the drawing in detail, it will be seen that my cooking vessel (1), which is preferably of cylindrical form, is provided with a flange (2) and covered by a lid (3) which has a corresponding flange (4). It will be seen that the body of the lid is of semi-spherical shape and that its outside dimensions are such that it will fit into the cooking vessel if it is desired to turn the lid upside down as indicated in dotted lines in Figure 2. When in this position the lid will furnish a second cooking vessel in which such foods may be preferably cooked as do not require the extreme heat of a direct fire. The lid may be securely and steam-tightly fastened to the cooking vessel by means of a plurality of bolts (6) secured in lugs (7) rigidly fastened to the vessel and engaging suitable slots (10) formed by lips (8) extending from the lid, a wing nut (9) being preferably used to secure a tight fit.

It will be seen that a reversible lid of the form described or of any similar form will increase the usefulness of a cooking vessel considerably. If secured as shown in full lines in Figure 2 it increases the space enclosed by the vessel, and if secured the other way as shown in dotted lines it adapts the device to be used for two different purposes, that is, for cooking certain foods directly over the fire, and for utilizing the heat emanating from these foods for heating the contents of the lid, which do not require the same intensive heat.

A gauge (11) and a safety valve (12) may be added to increase the usefulness of the device.

I claim:

In combination with a cooking retort having a flange thereon, a lid having a cupped body portion of slightly smaller diameter than the retort so as to fit into the latter and a flange corresponding in size to the first flange and adapted to reversibly engage the same, and means for steamtightly securing the flanges to one another comprising bolts pivotally supported between lugs extending from the retort and registering recesses in the lid flange adapted to receive the bolts with nuts engaging the bolts for screwing the lid to the retort.

THOMAS KELLY.